United States Patent [19]
Kashimura

[11] Patent Number: 5,705,908
[45] Date of Patent: Jan. 6, 1998

[54] DRIVE UNIT AND A MOTOR DRIVE CONTROL METHOD

[75] Inventor: Hideo Kashimura, Tokyo, Japan

[73] Assignee: NEC Corporation, Tokyo, Japan

[21] Appl. No.: 670,822

[22] Filed: Jun. 25, 1996

[30] Foreign Application Priority Data

Jun. 27, 1995  [JP]  Japan ................... 7-161013

[51] Int. Cl.$^6$ .................. H02P 5/46; B41J 1/00
[52] U.S. Cl. .................. 318/625; 318/67; 318/34; 318/568.1; 318/696
[58] Field of Search .............. 318/40–98, 560–696

[56] References Cited

U.S. PATENT DOCUMENTS

| | | | |
|---|---|---|---|
| 4,136,303 | 1/1979 | Almquist et al. | 318/52 |
| 4,225,290 | 9/1980 | Allington | 318/48 |
| 4,918,365 | 4/1990 | Tanuma et al. | 318/685 |
| 4,961,037 | 10/1990 | Orii et al. | 318/696 |
| 5,528,114 | 6/1996 | Tokizaki et al. | 318/67 |

FOREIGN PATENT DOCUMENTS

| | | |
|---|---|---|
| 0 523 255 | 1/1993 | European Pat. Off. |
| 4-222435 | 8/1992 | Japan |

*Primary Examiner*—Paul Ip
*Attorney, Agent, or Firm*—Sughrue, Mion, Zinn, Macpeak & Seas, PLLC

[57] ABSTRACT

A drive unit capable of maintaining the stability of driving speed with respect to the driven part in which the motor is not used at a low drive efficiency. Said drive unit comprises the first and second stepping motors 12 and 14 transmitting power to the driven part at a rated driving output corresponding to the load torque of said driven part, the first and second motor drive control units 15 and 16 supplying electric power to these first and second stepping motors 12 and 14 and controlling their drive, a temperature detection circuit 7 detecting the temperature of the heat generated by these first and second motor drive control units 15 and 16 and outputting temperature detection signals, and a system control circuit 3 switching the allocation of the main drive unit or the auxiliary drive unit based on the temperature detection signals outputted from the allocation and temperature detection circuit 7 allocating one of the first or second stepping motors 12 or 14 to serve as the main drive unit or the auxiliary drive unit when the detected temperature has exceeded the previously set reference temperature.

10 Claims, 3 Drawing Sheets

FIG.2

| RANK | POWER LEVEL | | DRIVING TORQUE | REMARKS |
|---|---|---|---|---|
| | MAIN DRIVE UNIT | AUXILIARY DRIVE UNIT | | |
| 1 | 10 | 1 | SMALL ↑ ↓ LARGE | INITIAL STAGE |
| 2 | 10 | 2 | | |
| 3 | 10 | 3 | | |
| 4 | 10 | 4 | | |
| 5 | 10 | 5 | | |
| 6 | 10 | 6 | | |
| 7 | 10 | 7 | | |
| 8 | 10 | 8 | | |
| 9 | 10 | 9 | | |
| 10 | 10 | 10 | | |

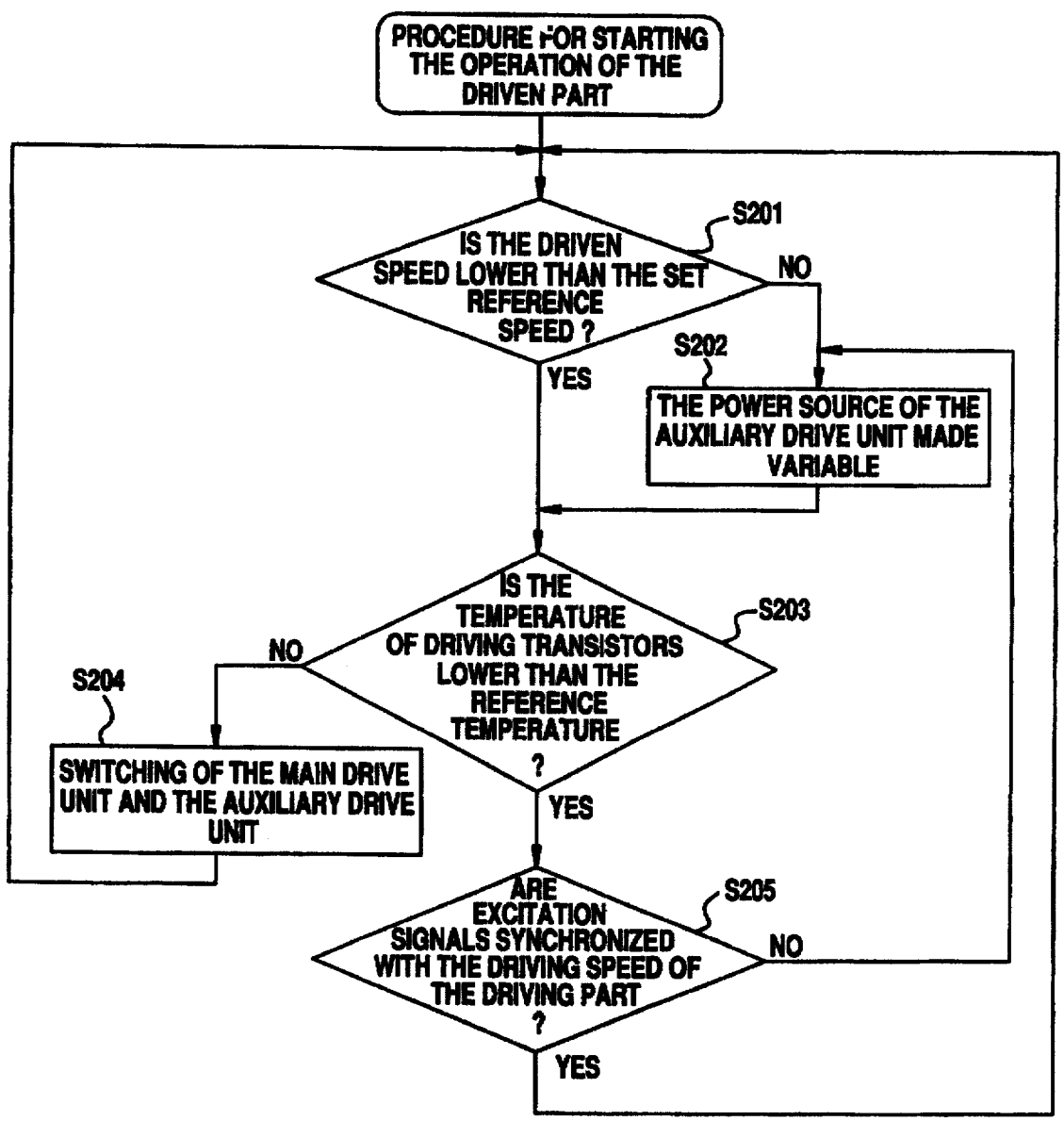

DRIVE UNIT AND A MOTOR DRIVE CONTROL METHOD

BACKGROUND OF THE INVENTION

1. Field of the Invention

This invention relates to a drive unit designed to drive the driven part in the direction of rotation or in linear direction using a stepping motor. In particular the invention relates to a drive unit and a motor drive control method capable of increasing the output torque without increasing the voltage of electric power and power consumption.

2. Description of the Prior Art

The stepping motor driven by pulses rotates at an angle proportionate to the number of pulses and is used to drive the driven part in the direction of rotation or in a linear direction.

In the case of a drive unit with a stepping motor, a large load torque requires an increase in the output torque of the stepping motor in order to stabilize the drive speed.

In increasing the output torque of the stepping motor, it is desirable that the output torque may be increased without increasing the voltage of electric power and that power consumption would not increase when the load torque is small.

Common methods for increasing the torque of a stepping motor include the use of a stepping motor with a large rated drive output, the use of a clutch and other mechanical means to combine with an auxiliary motor, the mechanical linkage of stepping motors of the same performance to operate them regularly in parallel to halve the load torque on each stepping motor, etc.

Japanese Patent Application Laid Open Hei 4 (1993)-222435 discloses the method of assisting the drive of the driven part by the main driving gear with a fixed drive output depending on the load of the driven part by transmitting the driving power of an auxiliary driving unit by the engagement of gears or through the combination of a pulley and a belt. This disclosed method prevents any uneven speed of movement of the driven part due to the load of the driven part.

However, the prior drive unit incorporating said methods have the following problems.

When a stepping motor with a large rated driving output is used, it is necessary to increase the stepping motor's power voltage, and therefore the drive circuit driving the components used in the stepping motor must be those for high tension.

When an auxiliary motor is used, a clutch mechanism for linking or separating the driven part and the auxiliary motor and its driving circuit are necessary.

When two stepping motors with the same performance are linked to drive regularly in parallel, and when the load torque is small, each stepping motor operates at below their respective rated driving output and therefore each motor is used at a low drive efficiency.

SUMMARY OF THE INVENTION

The purpose of this invention is to solve the above problems of the prior art and provide a motor drive control method capable of maintaining the stability of the driving speed of the driven part, preventing motors from being used at a low driving efficiency and improving the general driving efficiency.

In order to achieve the above purposes, the drive unit of this invention is provided with the first and second stepping motors that transmit the driving force to the driven part at a rated driving output corresponding to the load torque of the driven part, the first and second motor drive control units that supply electric power to the first and second stepping motors and control their drive operation, a speed detecting circuit that detects the driving speed of said driven part and outputs speed detection signals and a system control circuit that determines the driving output of said first and second drive control units based on the speed detection signals outputted by said speed detection circuit, said first and second motor drive control unit being provided with a temperature detection circuit that detects the temperature of the heat generated by each of said motor drive control units and outputs temperature detection signals, said system control circuit having an allocation function of allocating one of said first and second stepping motors as the main drive unit and the other as an auxiliary drive unit whose driving output is modified in response to said speed detection signals, and a switching function of switching the allocation of said first and second stepping motors as the main drive unit or the auxiliary drive unit when the temperature of said first or second motor drive control unit has exceeded a previously set reference temperature.

The motor drive control method of this invention is characterized by the provision of the first and second stepping motors transmitting motive force to the driven part with a rated driving output corresponding to the load torque of said driven part and the first and second motor drive control units which supply electric power to these first and second stepping motors and control their drive, and the allocation of one of said first or second stepping motors as the main driving unit and the other as the auxiliary driving unit to drive the driven part, and comprises the first step of detecting the driving speed of said driven part and of changing the driving output of one of the stepping motors chosen as the said auxiliary drive unit based on said detected speed, and the second step of detecting the temperature of the heat generated by said first and second motor drive control units and of switching the allocation of said first and second stepping motors as the main drive unit or the auxiliary drive unit when this detected temperature of the first or second motor drive control units has exceeded a previously set reference temperature.

According to this invention as mentioned above, the main drive unit always maintains the rated driving output and the auxiliary drive unit has its power supply controlled in response to the result of driving speed detection causing changes in its drive torque. As a result, in comparison with the case where a single stepping motor is used, the stability of operation can be assured without changes in load torque in the driven part affecting the same in any way. And in comparison with the case where two stepping motors are regularly linked and operated in parallel, power consumption can be reduced.

Moreover, when the temperature of driving transistors exceeds the reference temperature, the system control circuit switches the functions of the first and second stepping motors as the main drive unit and the auxiliary drive unit. This can prevent the driving transistors from being burned or destroyed due to rising temperature.

As described above, the drive unit of this invention which links two stepping motors of the same performance, connects them to the driven part and makes one of the stepping motors operate regularly with a rated driving output as the main drive unit and makes the other stepping motor operate as an auxiliary unit with a driving output less than the rated driving output as the auxiliary drive unit, the driving speed with reference to the driven part can be maintained at a stable level, and the general driving efficiency can be improved.

BRIEF DESCRIPTION OF THE DRAWINGS

In the accompanying drawings,

FIG. 2 is a table showing the ratio of power levels supplied to the main drive unit and the auxiliary drive unit; and FIG. 3 is a flow chart illustrating the operations of the drive units shown in FIG. 1.

DESCRIPTION OF THE PREFERRED EMBODIMENTS

Figure 1:
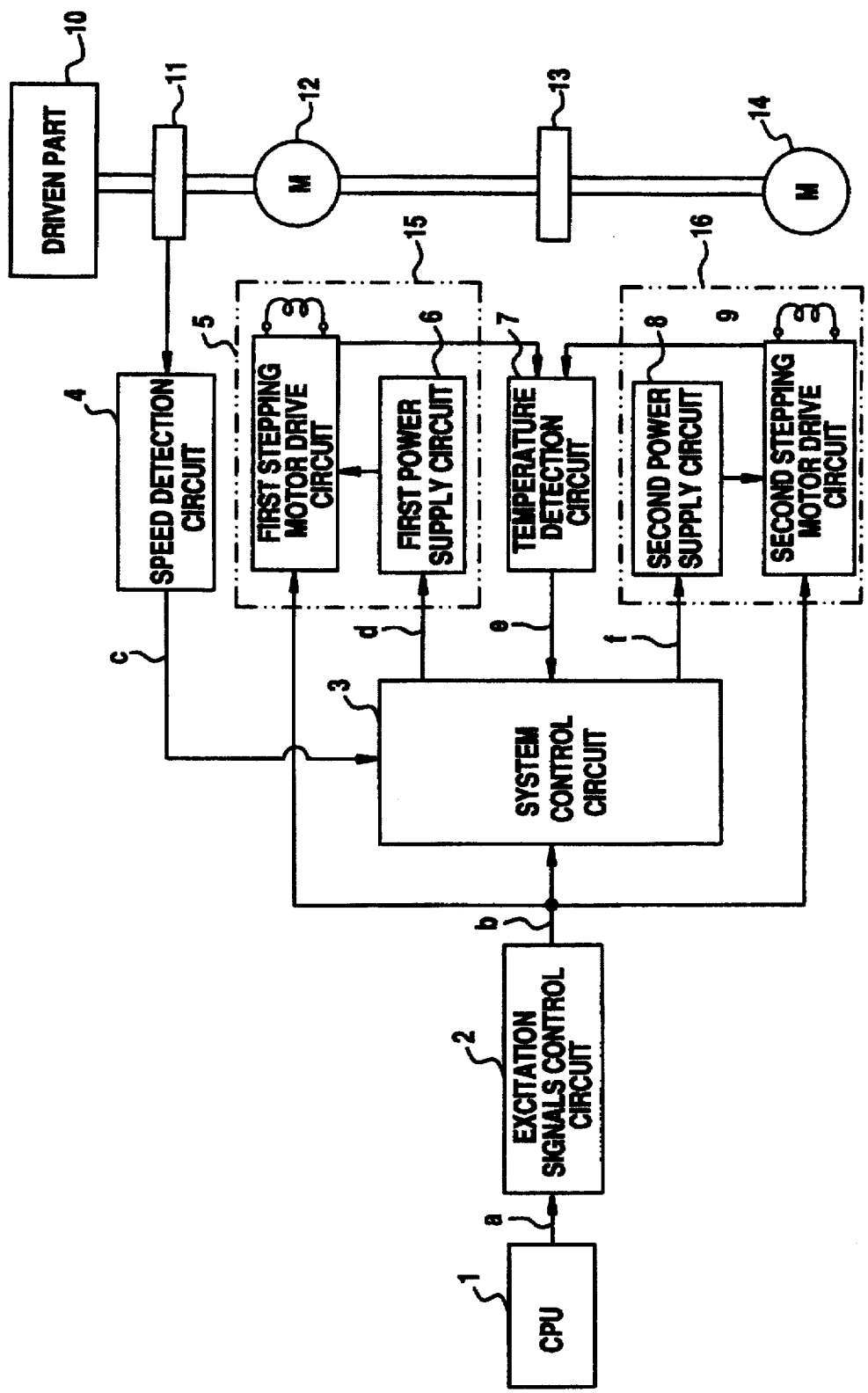
FIG. 1 is a schematic representation illustrating an embodiment of this invention.

The preferred embodiments of this invention shall be described below in detail with reference to the drawings.

FIG. 1 is a schematic diagram of an embodiment of this invention. In FIG. 1, the driven part 10 is connected with the first stepping motor 12 through the first drive shaft joint 11, and the first stepping motor 12 is connected with the second stepping motor 14 through the second drive shaft joint 13.

Each of the first stepping motor 12 and the second stepping motor 14 has a rated driving output corresponding to the load torque of the driven part 10, and their speed ratio is 1:1. In addition, the first stepping motor 12 and the second stepping motor 14 have the stators constituting the inside of each respective motor connected with the same phase.

The motor drive control unit 15 which controls the drive of the first stepping motor 12 comprises the first stepping motor drive circuit 5 and the first power supply circuit 6 supplying power to the first stepping motor drive circuit. The motor drive control unit 16 which controls the drive of the second stepping motor 14 comprises the second stepping motor drive circuit 9 and the second power supply circuit 8 supplying electric power to the second stepping motor drive circuit. These motor drive control units 15 and 16 provide input to a temperature detection circuit 7 detecting the temperature of the heat generated by said control units. In other words the direction circuit 7 selects the temperature Of each driving transistor of the first stepping motor drive circuit 5 and the second stepping motor drive circuit 9 and outputs temperature detection signals e. The temperature detection signals e outputted by this temperature detection circuit 7 are inputted into the system control circuit 3.

The speed detection circuit 4 detects the driving speed of the driven part 10 at the first driving shaft joint 11 and outputs speed detection signals c. The speed detection signals output from this speed detection circuit 4 are input into the system control circuit 3.

Upon receiving excitation signals a from the central processing unit (CPU) 1, the excitation signals control circuit 2 outputs phase output signals b. The phase output signals output from the excitation signals control circuit 2 are input into each of the first stepping motor drive circuit 5, the second stepping motor drive circuit 9 and the system control circuit 3. When excitation signals a are output from the central processing unit (CPU) 1 to drive the driven part 10, this excitation signals control circuit 2 outputs at the same time phase output signals b to the first stepping motor drive circuit 5, the second stepping motor drive circuit 9 and the system control circuit 3.

The system control circuit 3 which controls the power supply from the first power supply circuit 6 to the first stepping motor drive circuit 5 and the power supply from the second power supply circuit 8 to the second stepping motor drive circuit 9 supplies power to drive one of the first and second stepping motors 12 and 14 as the main drive unit and the other as the auxiliary drive unit. This power supply results from the output of the first and second power supply control signals d and f respectively to the first and second power supplied circuits 6 and 8. The power supply by this system control circuit 3 shall be described below in specific terms.

In the initial state, for example when the first stepping motor is used as the main drive unit to drive the driven part, the system control circuit 3 outputs the first power supply control signals d to the first power supply circuit 6 so that electric power giving sufficient driving torque with respect to the load torque of the driven part 10 may be supplied.

On the other hand, the system control circuit 3 outputs the second power supply control signals f to the second power supply circuit 8 so that enough power may be supplied to the second stepping motor 14 enabling the same not to be a burden on the first stepping motor 12. The second stepping motor 14 thus supplied with electric power rotates by keeping synchronism with the first stepping motor 12 but does not support the rotating force of the first stepping motor 12.

As each motor starts driving, the system control circuit 3, in response to the speed detection signals c output by the speed detection circuit 4, changes the second power supply control signals f so that the second stepping motor drive circuit 9 may supply the second stepping motor 14 with electric power corresponding to its driving speed.

The level of power supplied from the power supply circuits for each of the first stepping motor 12 and the second stepping motor 14 varies depending on whether each of them functions as the main drive unit or the auxiliary drive unit.

FIG. 2 shows the ratio of power levels supplied to the main drive unit and the auxiliary drive unit. As shown in FIG. 2, the whole range of driving speeds is divided into 10 ranks. The range of power levels supplied to the auxiliary driving unit is divided into 10 grades with the maximum rated output of the stepping motor being rated as 10 and the minimum output being rated as 1. Thus, as the driving torque grows larger, the power level also grows larger (from "small" to "large"). On the other hand, the power level supplied to the main drive units always remains at 10 (rated driving output).

In addition to the power supply corresponding to the driving speed mentioned above, the system control circuit 3 monitors from time to time the phase output signals b output by the excitation signals control circuit 2, the speed detection signals c output by the speed detection circuit 4 and the temperature detection signals e output by the temperature detection circuit 7.

When the first stepping motor is used as the main drive unit, the system control circuit 3 has the function of switching the main drive unit to the second motor 14 when the temperature of the driving transistor of the first stepping motor drive circuit 5 exceeds the reference temperature previously set and stored in the system control circuit 3. When the main drive unit is switched to the second stepping motor 14, the second power supply control signals f are output to the second power supply circuit 8 so that the second stepping motor 14 may be supplied with enough power to produce a sufficient driving torque with respect to the load torque of the driven part 10. On the other hand, the first power supply circuit 6 is provided with the first power supply control signals d so that the first stepping motor 12 may function as the auxiliary drive unit.

Similarly, when the temperature of the drive transistors of the second stepping motor drive circuit 9 exceeds the reference temperature previously set and stored in the system control circuit 3, the system control circuit 3 switches again the functions of the main drive unit and the auxiliary drive unit.

Now, the function of speed stabilization and that of temperature protection shall be described by referring to FIG. 3.

When CPU 1 outputs the excitation signals a to drive the driven part 10 to the excitation signals control circuit 2, the excitation signals control circuit 2 outputs phase output signals b to the first stepping motor drive circuit 5 and the second stepping motor drive circuit 9.

Initially the first stepping motor 12 is set to work as the main drive unit, and the second stepping motor 14 is set to work as the auxiliary drive unit. The power level of each stepping motor at this initial state is, for example, like the conditions of Rank 1 shown in FIG. 2.

To begin with, the system control circuit 3 compares the drive speed calculated on the basis of the phase output signals b with the reference drive speed previously set and stored in the system control circuit 3 (step 201).

In this step 201 mentioned above, when the drive speed calculated on the basis of the phase output signals b is lower than the set reference drive speed, the first power supply circuit 6 and the second power supply circuit 8 are respectively provided with the first power supply control signals d and the second power supply control signals f so that power may be supplied according to the power level set initially. When the drive speed calculated on the basis of the phase output signals b is higher than the set reference driving speed, the setting of the power level supplied to the second stepping motor 14 or the auxiliary drive unit is increased or otherwise adjusted so that a sufficient load torque may be supplied to the driven part 10 (step 202). And the first power supply circuit 6 and the second power supply circuit 8 are respectively provided with the first power supply control signals d and the second power supply control signals f so that electric power may be supplied according to this setting of power level.

Thanks to this step 202 mentioned above, the driving torque of the second stepping motor 14 or the auxiliary drive unit increases, and the driving torque of the first stepping motor 12 or the main drive unit is aided. This aid provided by the second stepping motor 14 to the driving torque enables to maintain the driving speed of the driven part 10.

Then the system control circuit 3 compares the temperature of each driving transistor of the first stepping motor drive circuit 5 and the second stepping motor drive circuit 9 (in other words temperature obtained from the temperature detection signals e output by the temperature detection circuit 7) with the reference temperature previously set and stored in the system control circuit 3 (step 203).

In the step 203 mentioned above, when the temperature of the driving transistors is higher than the reference temperature previously set and stored in the system control circuit 3, the system control circuit 3 switches the functions of the main drive unit and the auxiliary drive unit now allocated to the first stepping motor 12 and the second stepping motor 14 (step 204), and returns to the step 201 above. When the temperature of the driving transistors is lower than the reference temperature previously set, the system control circuit 3 determines that the allocation of functions to the main drive unit and the auxiliary drive unit is valid, and compares the phase output signals b with the speed detection signals c outputted from the speed detection circuit 4 (step 205).

In the step 205 mentioned above, when the timing of both signals is not synchronized, the system control circuit 3 determines that torque is insufficient and returns to the step 202 to start the procedure required to increase the power level supplied to the stepping motor working as the auxiliary drive unit. When the timing of both signals is synchronized, the system control circuit 3 returns to the step 201 in preparation for the input of the excitation signals a of the following cycle. This return to the step 201 enables to start the procedure to stabilize the driving speed according to the excitation signals a and to engage in a temperature protection procedure.

This invention has been described so far by referring to a preferred embodiment, but this invention is not necessarily limited to the embodiment described above. For example, it is possible to avoid the allocation of the first stepping motor and the second stepping motor as the main drive unit and the auxiliary drive unit and to monitor instead changes in the load torque of the driven part 10 and the temperature of the driving transistors of both stepping motor drive circuits in order to control the power supply level to both stepping motors.

What is claimed is:

1. A drive unit operable to drive a driven part comprising:
    a first and a second stepping motor for transmitting power corresponding to a load torque of the driven part to the driven part;
    a first and a second motor control unit for respectively supplying electric power to said first and second stepping motors and for respectively controlling a driving operation of said first and second stepping motors;
    a speed detection circuit for detecting a driving speed of the driven part and for outputting speed detection signals;
    a temperature detection section for detecting a temperature generated by each of said first and second motor control units and for outputting temperature detection signals; and
    a system control circuit for determining a driving output of said first and second motor control units based on the speed detection signals output by said speed detection circuit for allocating one of said first and second stepping motors as a main drive unit and the other of said first and second stepping motors as an auxiliary drive unit, wherein a driving output of said auxiliary drive unit is modified according to said speed detection signals, and for switching an allocation of said first and second stepping motors as said main drive unit and said auxiliary drive unit based on the temperature detection signals output from said temperature detection section when the temperature of one of said first and second motor drive control units exceeds a reference temperature.

2. The drive unit as described in claim 1 in which said system control circuit further sets a power level supplied to one of the first and second stepping motors functioning as said auxiliary drive unit, said system control circuit raising the power level by equal increments up to a maximum value which corresponds to a power level supplied to the other of said first and second stepping motors.

3. The drive unit as described in claim 1 in which said system control circuit sets a minimum power level supplied to one of the first and second stepping motors functioning as said auxiliary drive unit at a power level that produces no burden on the other of said first and second stepping motors functioning as the main drive unit.

4. A motor drive control method for a drive unit including a first and second stepping motor for transmitting power to a driven part with a rated driving output corresponding to a load torque of the driven part, and a first and second motor drive control unit for supplying electric power to the first and second stepping motors and for controlling driving operations thereof, wherein one of said first and second stepping motors is allocated to work as a main drive unit and the other of said first and second stepping motors is allocated as an auxiliary drive unit, said control method comprising:

detecting a driving speed of the driven part and modifying a driving output to one of the first and second stepping motors functioning as said auxiliary drive unit based on said detected driving speed, and detecting a temperature of each of said first and second motor drive control units and switching an allocation of said first and second stepping motors as the main drive unit and the auxiliary drive unit when the detected temperature of one of the first and second motor drive control units exceeds a reference temperature.

5. The motor drive control method as described in claim 4 further comprising:

setting a level of electric power supplied to one of the first and second stepping motors functioning as said auxiliary drive unit such that said level may rise by equal increments up to a maximum level represented by a power level supplied to the other one of the first and second stepping motors functioning as the main drive unit.

6. The motor drive control method as described in claim 4 further comprising:

setting a minimum level of electric power supplied to one of the first and second stepping motors functioning as said auxiliary drive unit at a level of electric power that does not produce a burden on the other of said first and second stepping motors allocated as said main drive unit.

7. A drive unit operable to drive a driven part comprising:

a first and a second stepping motor for transmitting power corresponding to a load torque of the driven part to the driven part;

a first and a second motor control unit for respectively supplying electric power to said first and second stepping motors;

a speed detection circuit for detecting a driving speed of the driven part and outputting a speed detection signal; and a system control circuit for allocating one of said first and second stepping motors as a main drive unit and the other of said first and second stepping motors as an auxiliary drive unit, and for modifying a driving output of said auxiliary drive unit according to said speed detection signal.

8. The drive unit of claim 7, wherein said first and second stepping motors are disposed on a common shaft.

9. The drive unit of claim 8, in which said system control circuit further sets a power level supplied to one of the first and second stepping motors functioning as said auxiliary drive unit, said system control circuit raising the power level by equal increments up to a maximum value which corresponds to a power level supplied to the other of said first and second stepping motors.

10. The drive unit of claim 8, in which said system control circuit sets a minimum power level supplied to one of the first and second stepping motors functioning as said auxiliary drive unit at a power level that produces no burden on the other of said first and second stepping motors functioning as the main drive unit.

* * * * *